United States Patent
Marchi

[15] 3,678,353
[45] July 18, 1972

[54] ELECTRONIC DEVICE FOR ELECTRICALLY BRAKING INDUCTION MOTORS, PARTICULARLY THREE-PHASE MOTORS

[72] Inventor: Giorgio Marchi, Via Zuretti 64, Milano, Italy

[22] Filed: March 17, 1971

[21] Appl. No.: 125,073

[30] Foreign Application Priority Data

March 23, 1970 Italy...................22287 A/70

[52] U.S. Cl..............................318/211, 318/375
[51] Int. Cl..............................H02p 3/20
[58] Field of Search..................318/209–212, 375, 318/376

[56] References Cited

UNITED STATES PATENTS

| | | |
|---|---|---|
| 2,929,977 | 3/1960 | Choudhury............................318/212 |
| 2,445,430 | 7/1948 | Herchenroeder et al..............318/212 |
| 2,818,539 | 12/1957 | Johnson............................318/212 X |
| 2,922,097 | 1/1960 | Choudhury............................318/212 |
| 3,209,225 | 9/1965 | Choudhury............................318/212 |
| 3,412,304 | 11/1968 | Baum et al..........................318/212 X |

*Primary Examiner*—Gene Z. Rubinson
*Attorney*—Ostrolenk, Faber, Gerb & Soffen

[57] ABSTRACT

A dynamic brake circuit for an a-c motor which includes a single phase a-c circuit connected across two stator terminals of a three phase motor after the motor energizing circuit is opened. A first diode is connected in series with the single phase a-c circuit and the two stator terminals. Two additional diodes are connected from the stator terminal receiving the first diode to the other two stator terminals, respectively, by the device which connects the single phase a-c circuit to the stator terminals.

7 Claims, 14 Drawing Figures

3,678,353

ELECTRONIC DEVICE FOR ELECTRICALLY BRAKING INDUCTION MOTORS, PARTICULARLY THREE-PHASE MOTORS

This invention relates to a novel electric braking system for induction motors by a counter-rotating magnetic field, as well as to devices for installing such a system.

The braking system is well known for induction motors by means of a braking torque provided by a counter-rotating magnetic field, that is in a reverse direction to that providing for the motor running rotation. In the case of a three-phase asynchronous motor, for example, the counter-rotating magnetic field is provided by reversing two of the three supply polarities of the three-phase line. However, this braking system has the disadvantage of requiring the use of oversized motors with respect to the actually utilized power in order not to overheat the motor, as well as requiring expensive and complex auxiliary circuits to prevent motion reversal from occurring at the end of braking. The direct current or the rectified single-phase alternating current braking system is also known; but also such systems are not quite satisfactory, the former because of low efficiency and high installation cost, and the latter mainly because of high heating in the motor. Furthermore, both systems do not enable to obtain quick and reliable brakings.

It is the object of the present invention to provide a novel and simple counter-rotating field braking system overcoming the above mentioned disadvantages and particularly enabling to provide efficient brakings of a very short duration, so as to attain a high number of motor operations per hour.

A further object of the invention is to provide a braking system not requiring any servicing, having a high operation reliability and allowing ready adjustments in braking level by using static components.

According to the invention, these and other objects are accomplished by a counter-rotating magnetic field braking system consisting of cutting off, from the beginning and for all of the braking period, the stator winding from the normal alternating supply line for the motor, and supplying said winding with an alternating single-phase line through at least one unidirectional element and, at the same time, interconnecting by means of a unidirectional element at least the winding inlet and outlet terminals, which are connected to the single-phase line. The unidirectional element or elements connecting two terminals and inserted on the single-phase supply line are mounted in opposition to one another, thereby providing during braking operation one or more inner closed stator circuits, therein flowing such currents as generated by induced alternating electromotive forces due to rotor rotation, the intensity thereof being proportional to the speed of the latter; said electromotive forces building up a correspondent counter-rotating magnetic field, the braking torque of which is that substantially stopping the motor. In a simple embodiment, the devices for installing such a braking system comprise, depending on the number of winding phases, two or three unidirectional elements, preferably of the semiconductor type, suitably inserted on the line and between the winding terminals.

In accordance with a further feature of the invention, by inserting control electrode semiconductor devices on the single-phase line, the winding supply current can be readily varied or controlled so as to provide braking intensities or levels varying as desired and according to any law.

Further features and advantages of the present invention will become apparent from the following description and accompanying drawings referring by mere way of not limiting example to some preferred embodiments.

Figure 1:
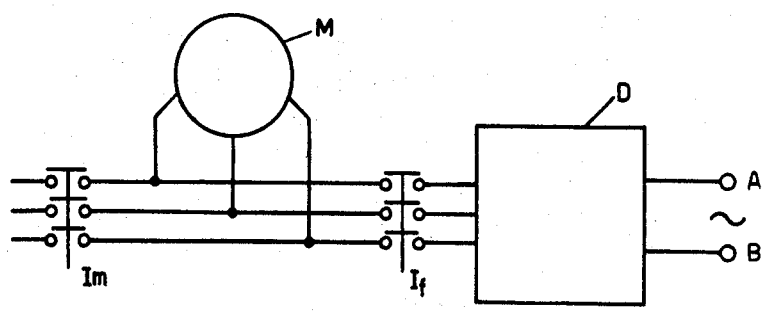
FIG. 1 shows the electric diagram for a three-phase motor, supposed to be an asynchronous motor, provided with the braking system in accordance with the invention.

Referring to FIG. 1, the electric induction motor is designated at M and, for simplicity in description, assumed to be an asynchronous three-phase motor, and at D the braking device according to the invention which on one side is connected across the terminals A and B to a single-phase A.C. power supply line and on the other side is connectable to motor M by means of switch $I_f$. Motor connection with the normal three-phase power supply line is accomplished by means of the other switch Im. Due to the open position of Im and $I_f$, the diagram in FIG. 1 corresponds to motor stop or rest condition. It is apparent that during normal motor running Im is closed and $I_f$ is opened, whereas during braking $I_f$ is closed and Im is opened. The control system for said switches may be any kind of system, either manual or automatic. It is an essential condition that closing of $I_f$ should be preceded by opening of Im and, conversely, closing of the latter should be preceded by opening of $I_f$.

Figure 2:
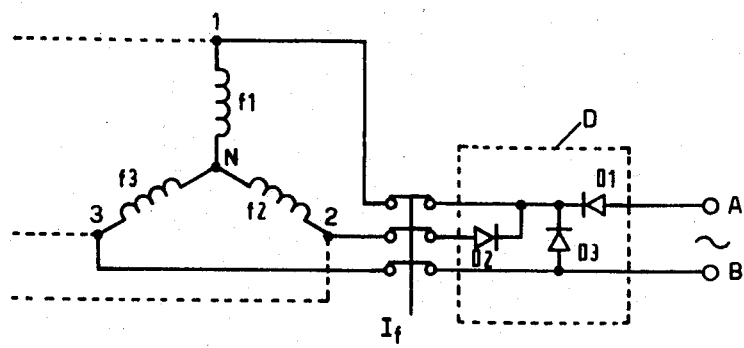
FIG. 2 shows the electric diagram of the Y-connected stator winding for the motor and braking system in FIG. 1, during braking operation.

In the diagram in FIG. 2 there are shown the three Y-connected phases $f_1, f_2$ and $f_3$ for the motor stator winding and the three unidirectional semiconductor components $D_1, D_2$ and $D_3$ comprising the braking device D in accordance with the invention. Numerals 1, 2 and 3 designate the three Y-connected winding terminals and letter N designates the neutral point. The three-phase power supply line is cut off and switch $I_f$ is closed, so that the diagram is that being provided at braking step.

Figure 3:
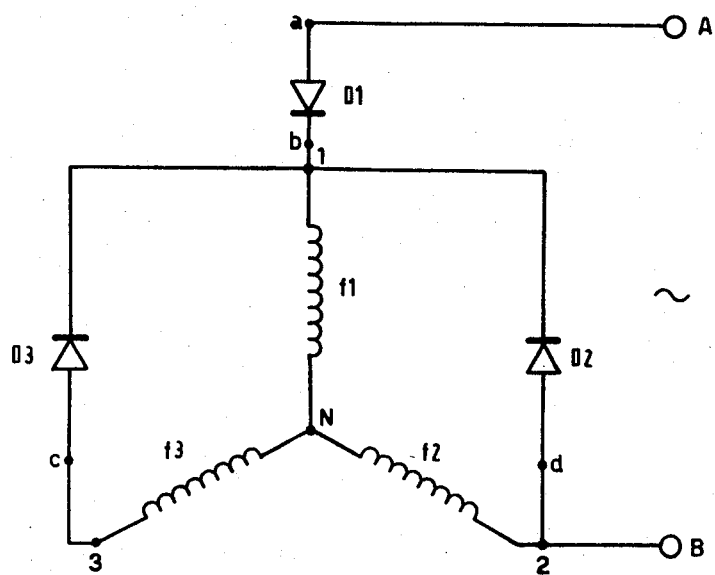
FIG. 3 is an enlarged simplified view of the diagram shown in FIG. 2.

The diagram in FIG. 3 is familiar to FIG. 2, the representation of switch $I_f$ being omitted. The components $D_1, D_2$ and $D_3$ are three rectifier diodes which are arranged as follows:

$D_1$ is series connected to one side of the single-phase power supply line terminating at terminal 1, while $D_2$ and $D_3$ respectively connected said terminal 1 with one of the other two terminals 2 and 3. The other side of the single-phase line may indifferently terminate at terminal 2, as shown in FIG. 3, or at terminal 3 as shown in FIG. 3. Diodes $D_2$ and $D_3$ are in opposition to each other and to $D_1$. In the diagram they are connected by the cathode to terminal 1, but all three could of course be polarity reversed so as to be connected by the anode to terminal 1.

Still referring to the diagram in FIG. 3, attention is now directed to the operation of the motor at a braking stage. By applying a single-phase A.C. power supply source to terminals A and B, a pulsating unidirectional current will flow through the stator winding, this current constituting the excitation current for the system during braking operation. Said current generates a unidirectional single-phase magnetic field. Furthermore, in the inner stator circuits provided by the phase windings and diodes $D_2$ and $D_3$, three-phase currents are generated due to three-phase electromotive forces in $f_1, f_2$ and $f_3$ as a result of rotor rotation. Because of these induced electromotive forces, a counter-rotating three-phase magnetic field is built up in the motor, the braking torque of which is that substantially causing the motor to be almost instantaneously stopped. Since the braking counter-rotating field is proportional to the induced electromotive forces, it will be apparent that the braking effect is higher at the braking starting (and the greater as the higher is the number of revolutions of the rotor) and of a gradually decreasing rate as the rotor slows down. When the rotor is stationary, said electromotive forces and induced currents and thus the counter-rotating field would be annulled, whereby the reversal of motion cannot occur at all.

By operating in accordance with the teachings of the invention, we have carried out many braking tests on induction motors of different designs and under different conditions in loading and single-phase power supply. In any case, the motor stop was attained in times of the order of fractions of seconds with low current absorptions from the single-phase power supply line and however, without causing any unacceptable overrisings of temperature in the stator winding. The reasons of these unexpected and surprising results (effective braking with rotor stop, minimal absorption from the single-phase power supply line and limited overrising of temperature) are not fully understood and the complex electrical and magnetic phenomena occuring in the motor during a braking operation are not entirely specificable and explainable as well. A confirmation of this situation may be had on examining some data as shown during a braking operation on a three-phase asynchronous motor connected as shown from the diagram in FIG. 3. The characteristics of the motor were as follows:

Ercole Marelli motor-Reg.n° 718056–791312xG-Mod.NV100 La 4
Voltage: 220/380 V; Frequency: 50 cps
Power: 3 HP; 2.2 kW; 1435 r.p.m.
V-connection voltage: 220 V
V-connection current: 9 A
Y-connection voltage: 380 V
Y-connection current: 5.2 A
Class E continuous duty
Single-phase power supply voltage = 380 V
Single-phase power supply frequency = 50 cps
$WD^2$ motor = 0.229
$WD^2$ no-load motor = 0.0234

Vectorial diagram for the phase currents at braking starting

Figure 4:
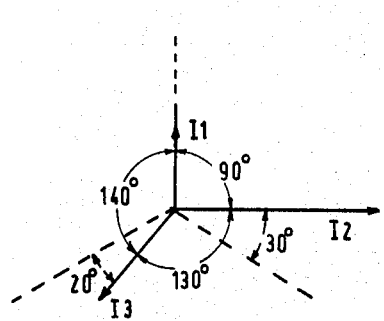
FIG. 4 is a vectorial representation for the currents in the three phases of the motor according to the diagram in FIG. 3, at braking start in the first electrical 360°.

FIG. 4 shows the diagram by full lines the momentary currents $I_1$, $I_2$ and $I_3$ as measured by a vectorscope at the beginning of a braking operation at phases $f_1$, $f_2$ and $f_3$. As it will be seen, the value of the currents is different and namely $I_1 = 25$ A, $I_2 = 75$ A and $I_3 = 40$ A. The phase displacement angles are also different, namely 90° between $I_1$ and $I_2$, 130° between $I_2$ and $I_3$, and 140° between $I_1$ and $I_3$. The dashed lines, out of phase by 120°, are the vectorial representation for the currents circulating in phases $f_1$, $f_2$ and $f_3$ during normal running of the motor (Im closed, If open).

Oscillographic current diagram during braking operation

Figure 5:
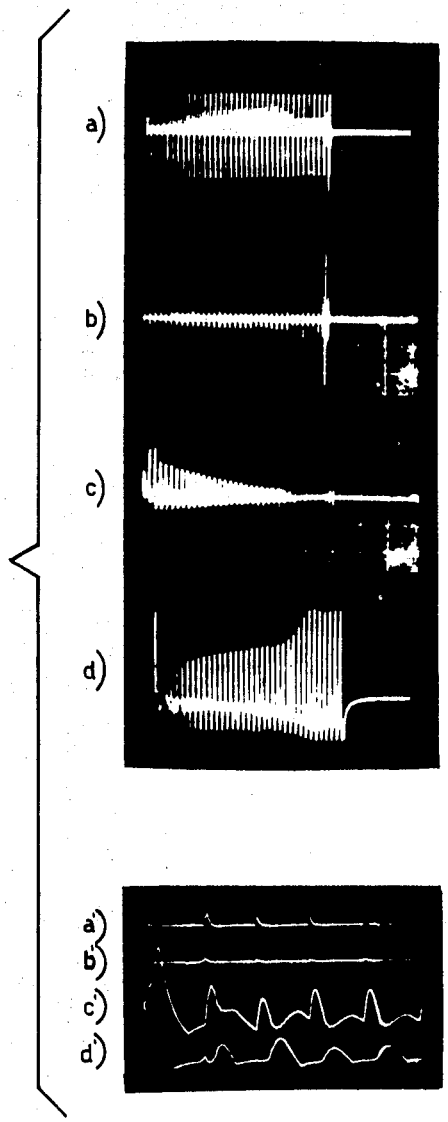
FIG. 5 shows the current diagram in the supply line and at some locations of the motor according to the scheme in FIG. 3, during braking operation.

By means of an oscilloscope the current shape was provided at points a, b, c and d of the diagram in FIG. 3 from the beginning to braking completion. The current shape at such points is shown in FIG. 5, respectively on the diagrams a), b), c) and d), or on the diagrams a'), b'), c') and d') which are the same, but on an enlarged scale and relatively at an initial braking time. From these diagrams it should be noted that:

at point a (see diagrams b–a') the current absorbed by the single-phase power supply line is of unidirectional pulse shape and maintained at a costant level throughout the braking time;
at point b (see diagrams b–b') the current shape is the same as at a, but with lower peaks;
at point c (see diagrams c–c') the current is alternating with a decreasing shape until being annulled on motor stop; at point d (see diagrams d–d') the current is alternating with an increasing shape at braking start, then being held at a constant level and suddenly be annulled on motor stop.

Diagram of the braking torque

Figure 6:
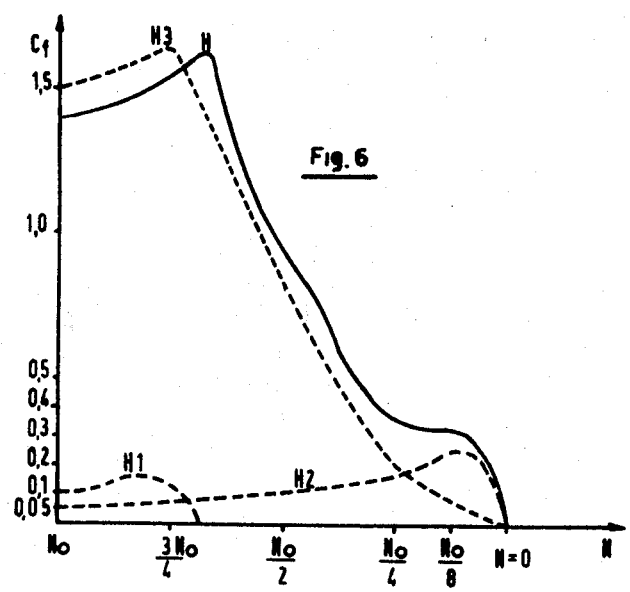
FIG. 6 shows the resulting braking torque diagram of the motor according to the scheme in FIG. 3, during braking operation.

The diagram (torque $C_f$ and number $N$ of rotor revolutions) in FIG. 6 shows the shape for the several torques (or on a different scale, the shape of the magnetic fields) being built up in the motor during braking operation. $N_o$ indicates the r.p.m. for the rotor at the beginning of a braking operation. It should be noted that the resulting braking torque H, shown by full lines, is the algebraic sum of three torques $H_1$, $H_2$ and $H_3$, the shape of which is as shown by dashed lines. Torque $H_1$ is due to a direct single-phase field as produced by rotor hysteresis. This torque tends to keep the rotor rotating, rather than to stop its rotation. However, just after braking start, this torque will be annulled. Torque $H_2$ is a braking torque and is due to the average level of the unidirectional magnetic field generated by the rectified current of the single-phase power supply line. This torque is annulled when $N = o$. Torque $H_3$ is also a braking torque and is due to the three-phase counter-rotating magnetic field generated by the electromotive forces and induced currents in phases $f_1$, $f_2$ and $f_3$ as a result of rotor rotation upon braking. At braking start, the braking effect is to a nearly total extent due to torque $H_3$ depending on the three-phase counter-rotating magnetic field, whereas and only to a reduced extent this braking effect is due to the field of the unidirectional direct current component. Therefore, the braking effect of the latter current is a secondary and negligible phenomenon, whereby a D.C. braking system cannot be conceived. Although, as above started, the braking accompanying phenomena are not completely explicable, a sure and significant datum is that braking provided according to the system of the invention is effective, reliable and does not involve any kind of drawbacks, as confirmed by some comparative data shown in the following table and provided still by the same three-phase induction motor manufactured by Ercole Marelli, under different braking conditions:

| Three-phase asynchronous motor - "Ercole Marelli" | Initial or stall current (A) | Current shape | No. of startings per hr. | No. of brakings per hr. | Braking time (sec) | Stator winding $\Delta t$ |
|---|---|---|---|---|---|---|
| Only startings | 8.34 (phase) | sinusoidal | 450 | — | — | 60° C |
| Inventive braking | 7 (a) | non-sinus. | 360 | 360 | 0.7 | 89° C |
| D.C. braking | 15 (a) | D.C. | 360 | 360 | 2.7 | 73° C |
| Half-wave D.C. braking | 4 (a) | half-wave | 180 | 180 | 2.5 | 126° C |
| Plugging braking | 8 (phase) | sinusoidal | 360 | 360 | 0.5 | 130° C |

Only startings: carried out by connecting the motor to the three-phase power supply line; $I_f$ open (FIG. 2).
Inventive braking: carried out with $D_1$, $D_2$ and $D_3$ "on." Low absorbed current and less than the stall current at starting. Effective braking, $\Delta t$ normal. The same results are obtained, except for a slight increase in current, by substituting $D_1$ for a controlled diode SCR for purposes to be discussed in the following.
D.C. braking: carried out with the motor supplied from a D.C. source, while $D_1$, $D_2$ and $D_3$ are "off" and only two phases are "on." High absorbed current. Not effective braking.
Half-wave D.C. braking: carried out with motor supplied from an A.C. single-phase line through $D_1$, while $D_2$ and $D_3$ are cut off and terminals 2 and 3 are directly connected. Not effective braking and very high $\Delta t$.
Plugging braking: carried out with three-phase power supply line by reversal of two polarities ($I_f$ open). Rather high absorbed current and unacceptable $\Delta t$.

Figure 7:
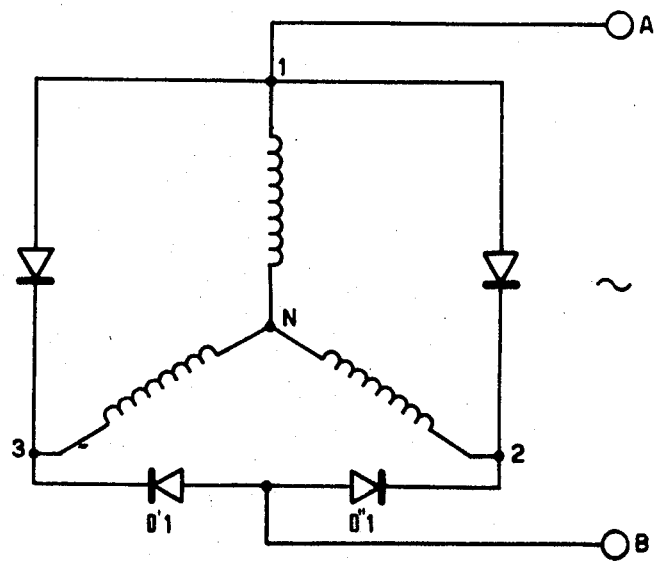
FIG. 7 shows a modified form for the scheme in FIG. 3.

In all of the above operations, Δt is the temperature increase in stator windings above room temperature (20° C). Similar tests have also been carried out by disconnecting one of the winding phases, namely that not connected to the line. The counter-rotating magnetic field was of the two-phase character and braking rate was lowered. On the contrary, satisfactory results have been obtained by the diagrams in FIGS. 7 and 8, differing from that in FIG. 3, the former because of using two diodes $D_1'$, $D_1''$ parallel connected on the power supply line, instead of one diode, and the latter because of phases delta connected, rather than Y connected.

Figures 8, 9:
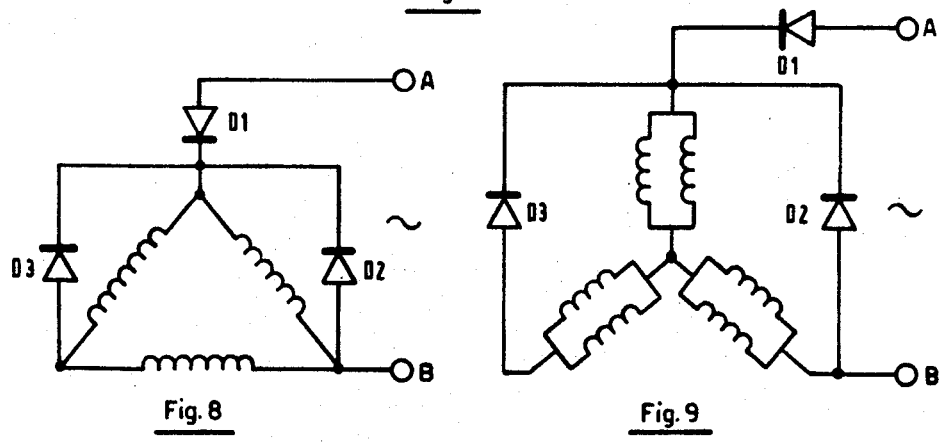
FIG. 8 shows a scheme similar to that in FIG. 3, relating to a V connection of the phases.
FIG. 9 is the scheme similar to that in FIG. 3 as referred to a Y-connected hexa-phase system.
Figure 10:
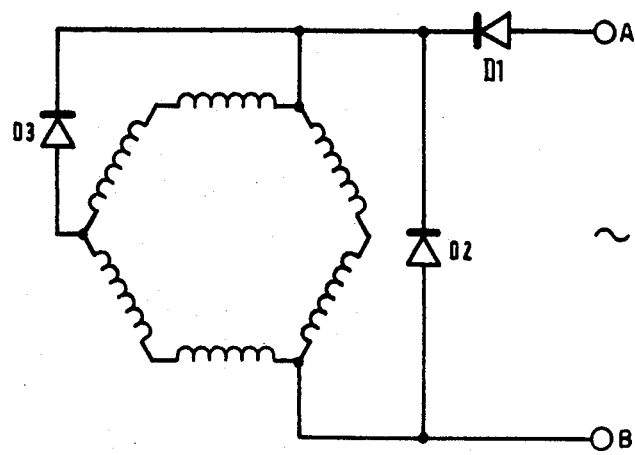
FIG. 10 is the scheme in FIG. 8 as referred to a poly-phase system.

The diagrams in FIGS. 9 and 10 show the device according to the invention as applied to a multiphase induction motor, which can be led or related back to three-phase systems of delta and Y-connections, respectively.

Figure 11:
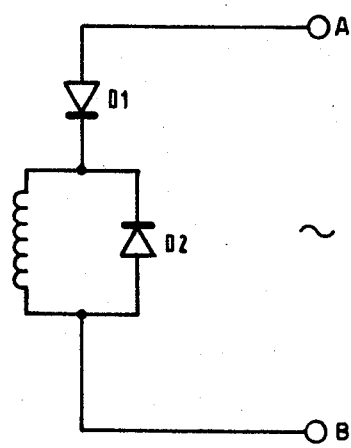
FIGS. 11 and 12 show two electric diagrams relating to a single-phase motor.
Figure 12:
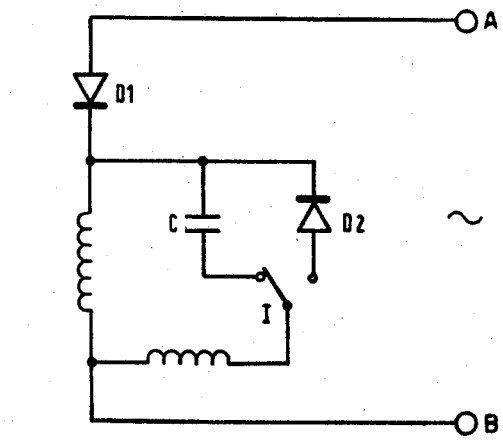

In the case of a single-phase induction motor, which is substantially a two-phase motor, the diagrams would be those as shown in FIGS. 11 and 12, where again a diode $D_1$ is series connected to the line and a second diode $D_2$ is parallel connected to the phase winding. In FIG. 12, the motor has a starting capacitor C, also parallel connected with the winding. In this case, it is apparent that on connecting the braking device, the switch I should also be switched at the same time in order to parallel connect $D_2$ with the phase.

Figure 13:
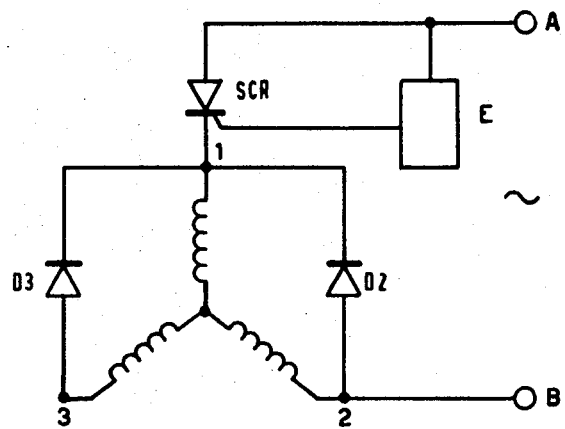
FIG. 13 is the scheme in FIG. 3 completed with a control device for the line supply.
Figure 14:
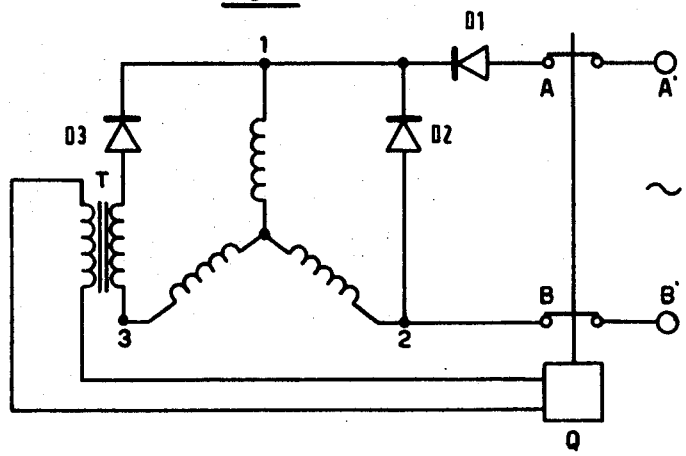
FIG. 14 is the scheme in FIG. 3 completed with a device for controlling the interruption of the supply line when the motor is at a stop.

In FIGS. 13 and 14 the diagram in FIG. 3 is still taken into consideration, but completed with auxiliary devices in order to achieve particular operating and controlling conditions. In FIG. 13, in the place of diode $D_1$, a silicone controlled rectifier SCR is connected and has its control (gate) electrode driven by a device E which is supplied from the power line or any other source. By such an arrangement, the supply from the power line can be controlled so as to attain brakings of varying levels in accordance with any law. The control of the power supply current by means of the silicon controlled rectifier SCR can find a useful and simple application in the lift or elevator art in order to control by a predetermined law the cabin braking on approaching the stop floor. In such a case it is only needed to compare the voltage signals from a tachymetric dynamo carried on the motor shaft and from a braking program circuit, and to control through E the SCR's gate by the resulting voltage signal to have a desired predetermined law for cabin stop. As apparent, a simple resistor could be connected on the line for current regulation.

Finally, the diagram in FIG. 14 is completed with an auxiliary device serving the purpose of cutting off the power supply of line A', B' upon motor stop. To this end, a transformer T is provided, having its primary winding series connected to $D_3$ and its secondary winding connected to control device Q which, when energized, is capable of cutting off the line. The primary winding of T has to be series connected to that phase the terminal of which is not connected to the line, in the diagram this phase being that between 1 and 3. Thus, upon rotor stop, the induced three-phase currents will be annulled and, as a result, the alternating current through the primary winding is zero. The simultaneous annulling for the current induced in the secondary winding will cause Q energization which provides for opening the line, for example in a mechanical mode. Thus, on braking completion, the passage of current through the windings between terminals 1 and 2 connected to the line is prevented. In the case diode $D_1$ comprises a silicon controlled rectifier SCR, the device Q can operate to cause the disconnection of SCR by acting on the control (gate) electrode.

What is claimed is:

1. An electric braking system for an induction motor having a stator winding structure, and wherein braking is achieved by means of a braking torque generated by a counter-rotating magnetic field; said system including:
   an a-c power supply circuit,
   a single-phase a-c braking current supply circuit,
   first and second rectifier means each capable of conducting unidirectional current therethrough,
   first switching means selectively operable for connecting and disconnecting said a-c power supply circuit to said stator winding structure,
   a first closed circuit including the series connection of said single-phase a-c braking current supply circuit, said first rectifier means, and said stator winding structure, with said first rectifier means being poled to allow unidirectional current flow in said first closed circuit and through said stator winding structure with a given polarity,
   a second closed circuit including the closed series connection of said second rectifier means and said stator winding structure, with said second rectifier means being poled to allow unidirectional current flow in said second closed circuit and through said stator winding structure with said given polarity,
   second switching means connected in both said first and second closed circuits and operable to close said first and second closed circuits after said first switching means opens,
   whereby, during motor braking, said first switching means is opened and said second switching means is closed so that currents circulate through said stator winding structure the motor rotor, which circulating currents have a magnitude proportional to the speed of the rotor, and build up a counterrotating magnetic field which produces a braking torque for stopping rotor rotation.

2. The braking system of claim 1 wherein said stator winding structure is a multiphase winding having at least first, second and third terminals and wherein said a-c power supply circuit comprises a multiphase a-c source, and wherein said second rectifier means includes a first diode and a second diode, each having anode and cathode electrodes; one of each of said anode or cathode electrodes of said first and second diodes connected to said first and second terminals respectively of said multiphase winding; said first rectifier means having anode and cathode terminals; one of said anode or said cathode electrodes of said first rectifier means connected to said third terminal; the other of said anode or cathode electrodes of said first and second diodes connected to said third terminal; all of the electrodes of said first and second diodes and of said first rectifier means consisting of one of all anodes or all cathodes.

3. The braking system of claim 1 wherein said stator winding structure is a multiphase winding having at least first, second and third terminals and wherein said a-c power supply circuit comprises a multiphase a-c source, and wherein said second rectifier means includes a first diode and a second diode, each having anode and cathode electrodes; one of each of said anode or cathode electrodes of said first and second diodes connected to said first and second terminals respectively of said multiphase winding; said second rectifier means including third and fourth diodes, each having anode and cathode electrodes; one of each of said anode or cathode electrodes of said third and fourth diodes connected to said first and second terminals of said multiphase winding, whereby either all anodes or all cathodes of said diodes are connected to said first and second terminals; said third terminals and the other of said anode or cathode terminals of said third and fourth diodes being connected to respective terminals of said single-phase a-c braking current supply circuit.

4. The braking system of claim 1 wherein said stator winding structure is a single-phase winding having first and second terminals; each of said first and second rectifier means having respective anode and cathode electrodes; one of each of either both said anode electrodes or both said cathode electrodes connected to said first terminal; the other of said both anode or both cathode electrodes of said second rectifier means being connected to said second terminal.

5. The electric braking system of claim 1 wherein said first rectifier means comprises a controlled rectifier having a control electrode, and which further includes control circuit means connected to said control electrode for controlling the conduction of said controlled rectifier in a predetermined manner.

6. The braking system of claim 2 which further includes transformer means connected between said first and third terminals; and means coupling said transformer means to said second switching means for opening said second switching means when current in said stator winding structure is zero.

7. The braking system of claim 5 which further includes transformer means connected between said first and third terminals; and means coupling said transformer means to said second switching means for opening said second switching means when current in said stator winding structure is zero.

* * * * *